(12) United States Patent
Patrick et al.

(10) Patent No.: US 8,665,275 B1
(45) Date of Patent: Mar. 4, 2014

(54) GRAPHICAL USER INTERFACE TIMELINE GRAPH FOR NAVIGATING EVENTS OF A BACKUP JOB

(71) Applicant: StorageCraft Technology Corporation, Draper, UT (US)

(72) Inventors: Nathan Andrew Patrick, Springville, UT (US); Stuart Blake Fordham, Lindon, UT (US); Jeffrey Leo Harris, Orem, UT (US)

(73) Assignee: Storagecraft Technology Corporation, Draper, UT (US)

( * ) Notice: Subject to any disclaimer, the term of this patent is extended or adjusted under 35 U.S.C. 154(b) by 0 days.

(21) Appl. No.: 13/914,390

(22) Filed: Jun. 10, 2013

(51) Int. Cl.
*G06T 11/20* (2006.01)
(52) U.S. Cl.
USPC .......................................................... 345/440
(58) Field of Classification Search
CPC ............ G06F 11/1446; G06F 11/1448; H04L 41/0859; G06T 11/206
USPC ........................................................ 345/440
See application file for complete search history.

(56) References Cited

U.S. PATENT DOCUMENTS

| 2002/0174140 | A1* | 11/2002 | Peake et al. ................... | 707/500 |
| 2012/0120078 | A1* | 5/2012 | Hubbard ....................... | 345/440 |
| 2012/0215743 | A1* | 8/2012 | Triantafillos et al. ......... | 707/654 |

* cited by examiner

*Primary Examiner* — Jeffery A Brier
(74) *Attorney, Agent, or Firm* — Maschoff Brennan (57) ABSTRACT

Graphical user interface timeline graph for navigating events of a backup job. In one example embodiment, a non-transitory computer-readable medium stores a program that causes a processor to generate and present a graphical user interface (GUI) timeline graph for navigating events of a backup job. The GUI timeline graph includes a first axis representing time periods over which events of a backup job took place, a second axis representing a data size associated with each of the events of the backup job, and objects positioned along the first axis and the second axis. Each of the objects corresponds to one of the events of the backup job. A width along the first axis of each of the objects represents the time period over which the corresponding event took place. A length along the second axis of each of the objects represents the data size associated with the corresponding event.

20 Claims, 10 Drawing Sheets

GRAPHICAL USER INTERFACE TIMELINE GRAPH FOR NAVIGATING EVENTS OF A BACKUP JOB

FIELD

The embodiments disclosed herein relate to a graphical user interface (GUI) timeline graph for navigating events of a backup job.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking.

One common problem encountered when backing up a source storage is management of the various image backup files related to a backup job for a source storage. Each time that a source storage is backed up during a backup job, an image backup file is created and stored in a destination storage. The history of image backup files created from a source storage during a backup job, as well as certain timing and other statistics related to each image backup file, can be very important when ascertaining the current state of a backup job. Where a backup job includes multiple image backup files, it can be difficult to grasp timing and other statistics of the image backup files of the backup job in order to ascertain the current state of the backup job.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to a graphical user interface (GUI) timeline graph for navigating events of a backup job. The example GUI timeline graphs disclosed herein may be employed to visually present a history of events of a backup job that a user can navigate. The example GUI timeline graphs disclosed herein disclose both time periods over which events of a backup job took place as well as data sizes associated with the events of the backup job, thus enabling a user to quickly grasp timing and other statistics of the image backup files of a backup job in order to ascertain the current state of the backup job.

In one example embodiment, a non-transitory computer-readable medium stores a program that causes a processor to generate and present a graphical user interface (GUI) timeline graph for navigating events of a backup job. The GUI timeline graph includes a first axis representing time periods over which events of a backup job took place, a second axis representing a data size associated with each of the events of the backup job, and objects positioned along the first axis and the second axis. Each of the objects corresponds to one of the events of the backup job. A width along the first axis of each of the objects represents the time period over which the corresponding event took place. A length along the second axis of each of the objects represents the data size associated with the corresponding event.

In another example embodiment, a non-transitory computer-readable medium stores a program that causes a processor to generate and present a graphical user interface (GUI) timeline graph for navigating events of a backup job. The GUI timeline graph includes a first axis representing time periods over which events of a backup job took place, a second axis representing a data size of the image backup file or files associated with each of the events of the backup job, and objects positioned along the first axis and the second axis. Each of the events of the backup job includes an attempt to create an image backup file for each of one or more volumes of a computer. Each of the objects corresponds to one of the events of the backup job. A width along the first axis of each of the objects represents the time period over which the corresponding event took place. A length along the second axis of each of the objects represents the data size associated with the corresponding event.

In yet another example embodiment, a method for navigating events of a backup job includes presenting a first axis representing time periods over which events of a backup job took place, presenting a second axis representing a data size associated with each of the events of the backup job, and presenting objects positioned along the first axis and the second axis. Each of the objects corresponds to one of the events of the backup job. A width along the first axis of each of the presented objects represents the time period over which the corresponding event took place. A length along the second axis of each of the presented objects represents the data size associated with the corresponding event.

It is to be understood that both the foregoing general description and the following detailed description are exemplary and explanatory and are not restrictive of the invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein include a graphical user interface (GUI) timeline graph for navigating events of a backup job. The example GUI timeline graphs disclosed herein may be employed to visually present a history of events of a backup job that a user can navigate. The example GUI timeline graphs disclosed herein disclose both time periods over which events of a backup job took place as well as data sizes associated with the events of the backup job, thus enabling a user to quickly grasp timing and other statistics of the image backup files of a backup job in order to ascertain the current state of the backup job.

The term "storage" as used herein refers to computer-readable media, or some logical portion thereof such as a volume, capable of storing data in blocks. The term "block" as used herein refers to a fixed-length discrete sequence of bits. The term "image backup file" refers to a file that includes a copy of one or more blocks from a storage, and may be a base image backup file, an incremental image backup file, or a differential image backup file. The term "backup job" refers to a backup plan for one or more volumes of a single computer system that may define a schedule for creating base image backup file(s), incremental image backup file(s), and differential image backup file(s), and may also define various details for the creation of the image backup files.

Figure 1:
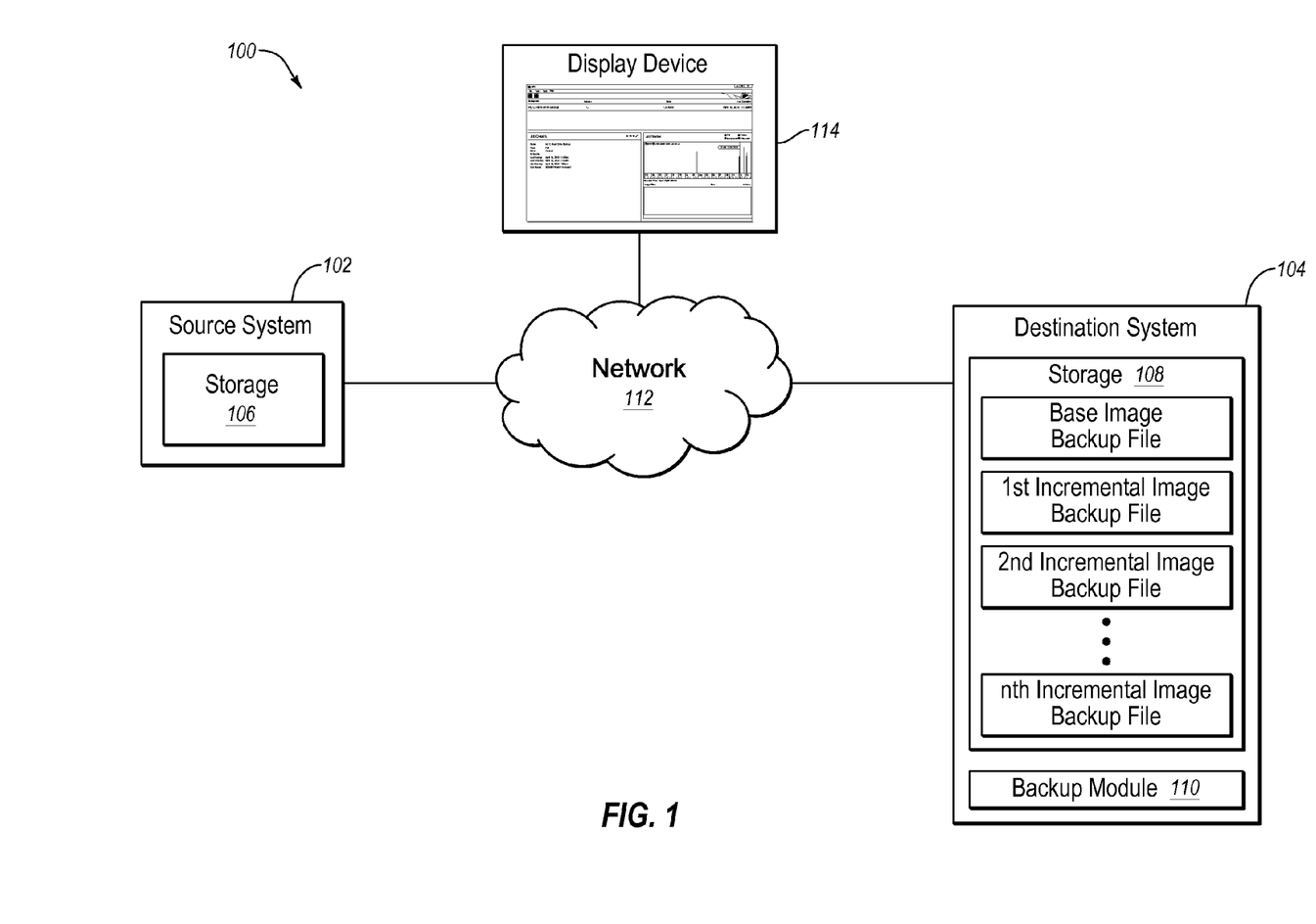
FIG. 1 is a schematic block diagram illustrating an example backup system.

FIG. 1 is a schematic block diagram illustrating an example backup system 100. As disclosed in FIG. 1, the example backup system 100 includes a source system 102 and a destination system 104. The systems 102 and 104 include storages 106 and 108, respectively. The destination storage 108 stores a base image backup file and multiple incremental image backup files that have been created of the source storage 106 at various points in time. The destination system 104 also includes a backup module 110, although the backup module 110 could instead be included in the source system 102. The systems 102 and 104 are able to communicate with one another over a network 112. A display device 114 may also be associated with the example backup system 100.

Each of the systems 102 and 104 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash memory drives, and virtual machines. The network 112 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof. The display device 114 may be any electronic display device capable of visually presenting a user interface to a user, such as a cathode ray tube (CRT) display, a light-emitting diode (LED) display, an electroluminescent display (ELD), a plasma display panel (PDP), a liquid crystal display (LCD), or an organic light-emitting diode display (OLED). In addition, the display device 114 may be a touch-screen implementation of any electronic display, including the example electronic displays listed above.

The image backup files stored in the destination storage 108 may be created by the backup module 110. For example, the backup module 110 may be configured to execute computer instructions to perform operations of creating a base image backup file and multiple incremental image backup files of the source storage 106. It is noted that these image backup files may initially be created on the source system 102 and then copied to the destination system 104.

For example, the base image backup file may be created to capture the state at time t(0). This may include the backup module 110 copying all allocated blocks of the source storage 106 as allocated at time t(0) and storing the allocated blocks in the destination storage 108. The state of the source storage 106 at time t(0) may be captured using snapshot technology in order to capture the data stored in the source storage 106 at time t(0) without interrupting other processes, thus avoiding downtime of the source storage 106. The base backup may be very large depending on the size of the source storage 106 and the number of allocated blocks at time t(0). As a result, the base backup may take a relatively long time to create and consume a relatively large amount of space in the destination storage 108.

Next, the 1st and 2nd incremental image backup files may be created to capture the states at times t(1) and t(2), respectively. This may include copying only changed allocated blocks of the source storage 106 present at time t(1) and storing the changed allocated blocks in the destination storage 108, then later copying only changed allocated blocks of the source storage 106 present at time t(2) and storing the changed allocated blocks in the destination storage 108. The states of the source storage 106 at times t(1) and t(2) may again be captured using snapshot technology, thus avoiding downtime of the source storage 106. Each incremental image backup file may include only those allocated blocks from the source storage 106 that were changed after the time of the previous backup. Thus, the 1st incremental image backup file may include only those allocated blocks from the source storage 106 that changed between time t(0) and time t(1), and the 2nd incremental image backup file may include only those allocated blocks from the source storage 106 that changed between time t(1) and time t(2). In general, as compared to the base backup, each incremental backup may take a relatively short time to create and consume a relatively small storage space in the destination storage 108.

Finally, an nth incremental backup may be created to capture the state at time t(n). This may include copying only changed allocated blocks of the source storage 106 present at time t(n), using snapshot technology, and storing the changed allocated blocks in the destination storage 108. The nth incremental backup may include only those allocated blocks from the source storage 106 that changed between time t(n) and time t(n−1).

Therefore, incremental image backup files may be created on an ongoing basis. The frequency of creating new incremental image backup files may be altered as desired in order to adjust the amount of data that will be lost should the source storage 106 experience corruption of its stored data or become unavailable at any given point in time. The data from the source storage 106 can be restored to the state at the point in time of a particular incremental image backup file by applying the image backup files from oldest to newest, namely, first applying the base image backup file and then applying each successive incremental image backup file up to the particular incremental image backup file.

Although only allocated blocks are included in the example incremental image backup files discussed above, it is understood that in alternative implementations both allocated and unallocated blocks may be backed up during the creation of a base image backup file or an incremental image backup file. This is typically done for forensic purposes, because the contents of unallocated blocks can be interesting where the unallocated blocks contain data from a previous point in time when the blocks were in use and allocated. Therefore, the creation of base image backup files and incremental image backup files as disclosed herein is not limited to allocated blocks but may also include unallocated blocks. Further, although only base image backup files and incremental backup files are discussed above, it is understood that the source storage 106 may instead be backed up by creating a base image backup file and one or more decremental image backup files. Therefore, the creation of image backup files as disclosed herein is not limited to a base image backup file and incremental image backup files but may also include a base image backup file and decremental image backup files.

During performance of the example methods disclosed herein, the backup module 110 may identify multiple events in a backup job associated with the source storage. For example, the events of the backup job associated with the source storage 106 may include the creation of the base image backup file and the creations of the 1st, 2nd, and nth incremental image backup files that are stored in the destination storage 108. The backup module 110 may then present these four events on a GUI timeline graph, on the display device 114 for example, that includes a first axis representing time periods over which the events of a backup job took place, a second axis representing a data size associated with each of the events of the backup job, and objects positioned along the first axis and the second axis, with each of the objects corresponding to one of the events of the backup job. As discussed in greater detail below, presenting the events of the backup job on a GUI timeline graph enables a user to quickly grasp timing and other statistics of the image backup files of the backup job in order to ascertain the current state of the backup job.

In one example embodiment, the source system 102 may be a desktop computer, the destination system 104 may be a file server, the network 112 may include the internet, and the display device 114 may be an LED monitor in communication with the file server. In this example embodiment, the file server may be configured to periodically back up the storage of the desktop computer over the internet as part of a backup job by creating the base image backup file and the multiple incremental image backup files stored in the destination storage 108. The file server may also be configured to display a history of the backup job on a GUI timeline graph on the LED monitor in order to allow a user to navigate events of the backup job. The file server may also be configured to restore one or more of the image backup files to the storage of the desktop computer over the internet if the desktop computer experiences corruption or a user simply desires to restore the storage of the desktop computer to an earlier point in time.

Although only a single storage is disclosed in each of the systems 102 and 104 in FIG. 1, it is understood that any of the systems 102 and 104 may instead include two or more storages. Further, although the systems 102 and 104 are disclosed in FIG. 1 as communicating over the network 112, it is understood that the systems 102 and 104 may instead communicate directly with each other. For example, in some embodiments the systems 102 and 104 may be combined into a single system. Also, although the storages 106 and 108 are disclosed as separate storages, it is understood that the storages 106 and 108 may be combined into a single storage. For example, in some embodiments a first volume of the source storage 106 may function as a source storage during the creation of a backup that is stored in a second volume of the source storage 106. Subsequently, the backup stored in the second volume may be restored to the first volume, which may enable the first volume of the source storage 106 to be restored to a state of an earlier point in time. In another example, the source system 102 may have a separate storage (not shown) to which a backup of the source storage 106 is restored. In both of these examples, the source system 102 functions as both a source system and a destination system. Further, although the backup module 110 is the only module disclosed in the example backup system 100 of FIG. 1, it is understood that the functionality of the backup module 110 may be replaced or augmented by one or more similar modules residing on either of the systems 102 and 104 or another system. Also, although the display device 114 is disclosed in FIG. 1 as being in remote communication with the source system 102 and the destination system 104 via the network 112, it is understood that the display device 114 may instead be in local communication with the source system 102 or the destination system 104, or another system of the example backup system 100, via a digital video interface (DVI) cable, a video graphics array (VGA) cable, or a high definition multimedia interface (HDMI) cable, for example. It is noted that regardless of whether the display device 114 disclosed in FIG. 1 communicates remotely over the network 112 or locally with the source system 102 or the destination system 104, it may communicate with the backup module 110 using network protocols.

Having described one specific environment with respect to FIG. 1, it is understood that the specific environment of FIG. 1 is only one of countless environments in which the example GUIs disclosed herein may be employed. The scope of the example embodiments is not intended to be limited to any particular environment.

Figure 2:
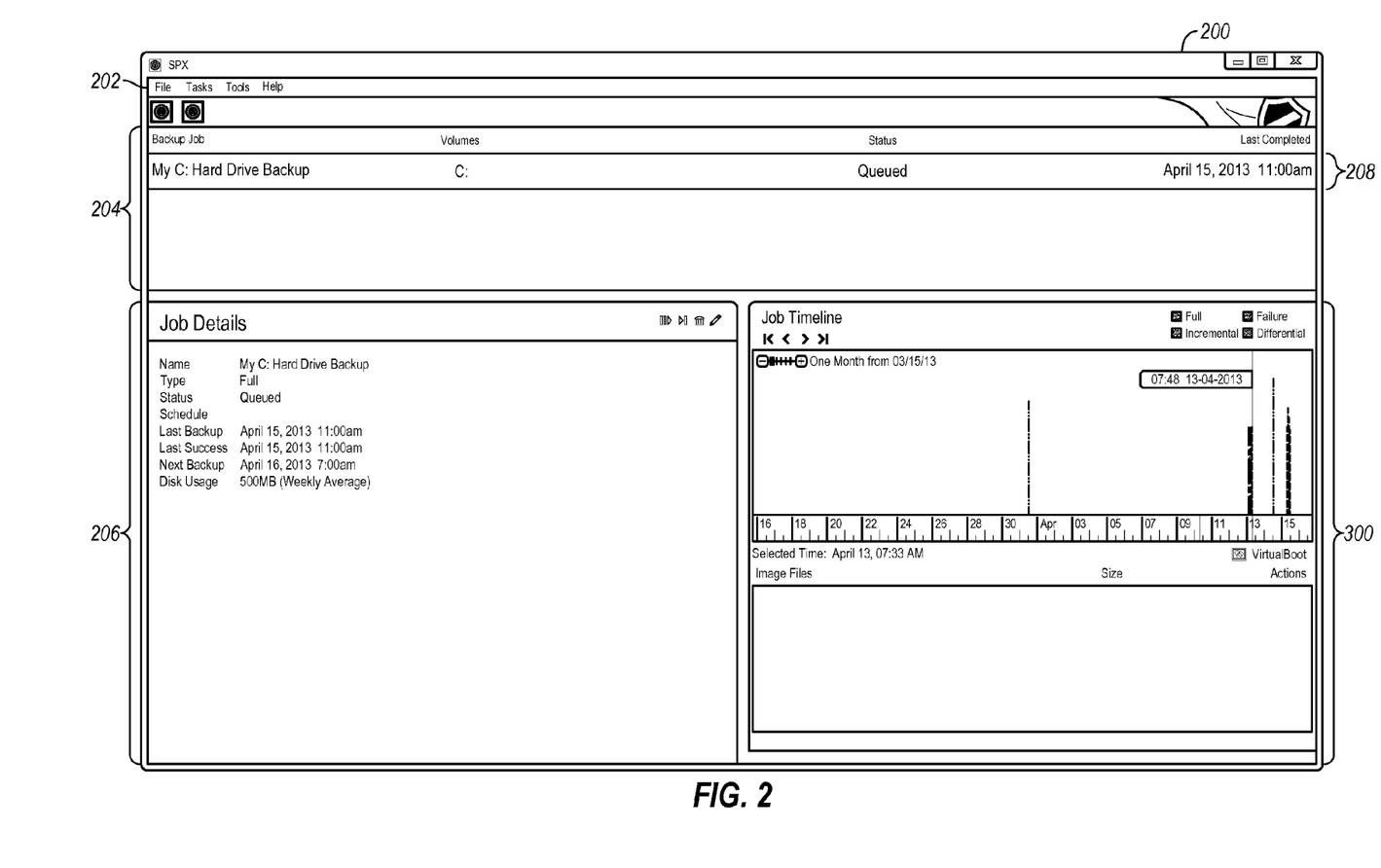
FIG. 2 illustrates an example graphical user interface (GUI) for managing backup jobs including a GUI timeline graph for navigating events of a backup job.

FIG. 2 illustrates an example GUI 200 for managing backup jobs including a GUI timeline graph 300 for navigating events of a backup job. The GUI 200 represents a console of the ShadowProtect® system produced by StorageCraft Technology Corporation in Draper, Utah. As disclosed in FIG. 2, the GUI 200 includes a menu bar 202, a backup job panel 204, a job details panel 206, and the GUI timeline graph 300.

The menu bar 202 is located at the top of the GUI 200 and provides access to general menus used to configure and operate the ShadowProtect® system. For example, the File menu may provide access to application-level options such as exiting the GUI 200. The Tasks menu may provide access to various ShadowProtect® Wizards such as a Backup Wizard, a Restore Wizard, an Explore Backup Image Wizard, a Backup Image Dismount Wizard, a Verify Image Wizard, and an Image Conversion Tool Wizard. In addition, the Tasks menu may allow the adding of a destination for image backup files and the refreshing of the volume list for a current system. The Tools menu may provide access to various ShadowProtect® Tools that allow a user to manage image backup files. The Help menu may provide access to ShadowProtect® help resources such as Help Contents, a Product Activation dialog box, a Latest Version dialog box, a Register option, and an About option.

The backup job panel 204 provides access to each backup job stored in the ShadowProtect® system. The backup job panel 204 may also allow a user to add, delete, or modify a backup job. For example, the backup job panel 204 in FIG. 2 displays a backup job 208 named "My C: Hard Drive Backup," which is a name that was either manually entered by a user or automatically chosen by the ShadowProtect® system. In addition to the name of the backup job, the backup job panel 204 displays which volume or volumes are included in the backup job, the status of the backup job, and the last completion time of the backup job. Although only the single backup job 208 is disclosed in FIG. 2, it is understood that one or more additional backup jobs may be displayed in the backup job panel 204. These additional backup jobs may be related the same computer as the backup job 208 or to a different computer.

The job details panel 206 displays additional details about the backup job that is currently selected in the backup job panel 204. For example, in FIG. 2 the job details panel 206 displays additional details about the backup job 208 such as the type, schedule, and disk usage of the backup job 208. The details displayed in the job details panel 206 in FIG. 2 are example details only, and it is understood that other details could alternatively or additionally be displayed in the job details panel 206.

Similar to the job details panel 206, the GUI timeline graph 300 also displays additional details about the backup job that is currently selected in the backup job panel 204. For example, in FIG. 2 the GUI timeline graph 300 displays additional details about the backup job 208. However, unlike the job details panel 206 which simply lists the details of the backup job 208, the GUI timeline graph 300 visually presents a history of events of the backup job 208 that a user can navigate. In particular, the example GUI timeline graph 300 displays both time periods over which events of the backup job 208 took place as well as data sizes associated with the events of the backup job 208. Thus, the example GUI timeline graph 300 enables a user to quickly grasp timing and other statistics of the image backup files of the backup job 208 in order to ascertain the current state of the backup job 208.

Having described one specific GUI environment with respect to FIG. 2, it is understood that the specific GUI 200 of FIG. 2 is only one of countless environments in which the example GUI timeline graph 300 disclosed herein may be employed. The scope of the GUI timeline graph 300 is not intended to be limited to any particular GUI environment.

Figure 3A:
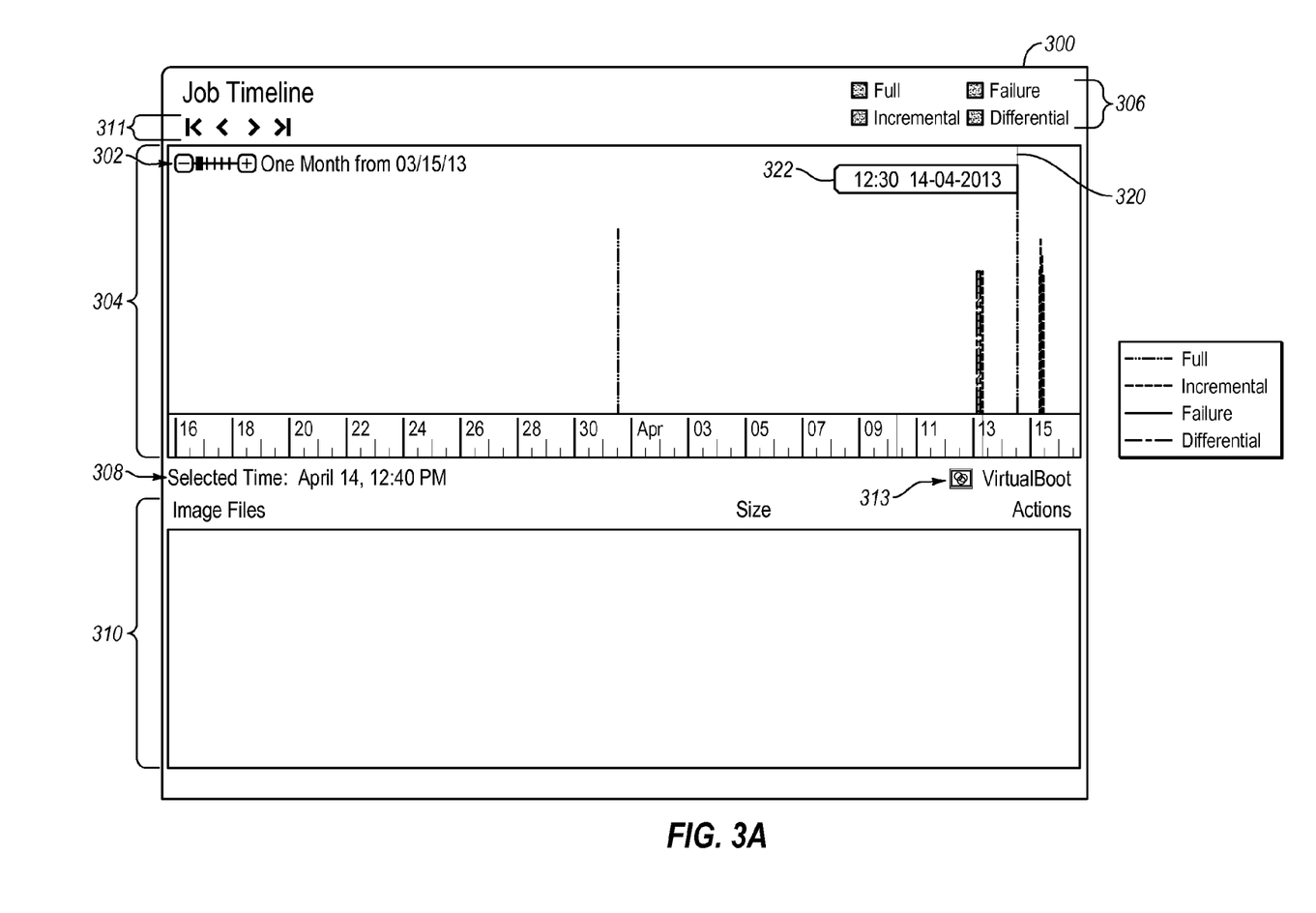
FIG. 3A illustrates the GUI timeline graph of FIG. 2 at a broad zoom level showing one month of events in the backup job.
Figure 3B:
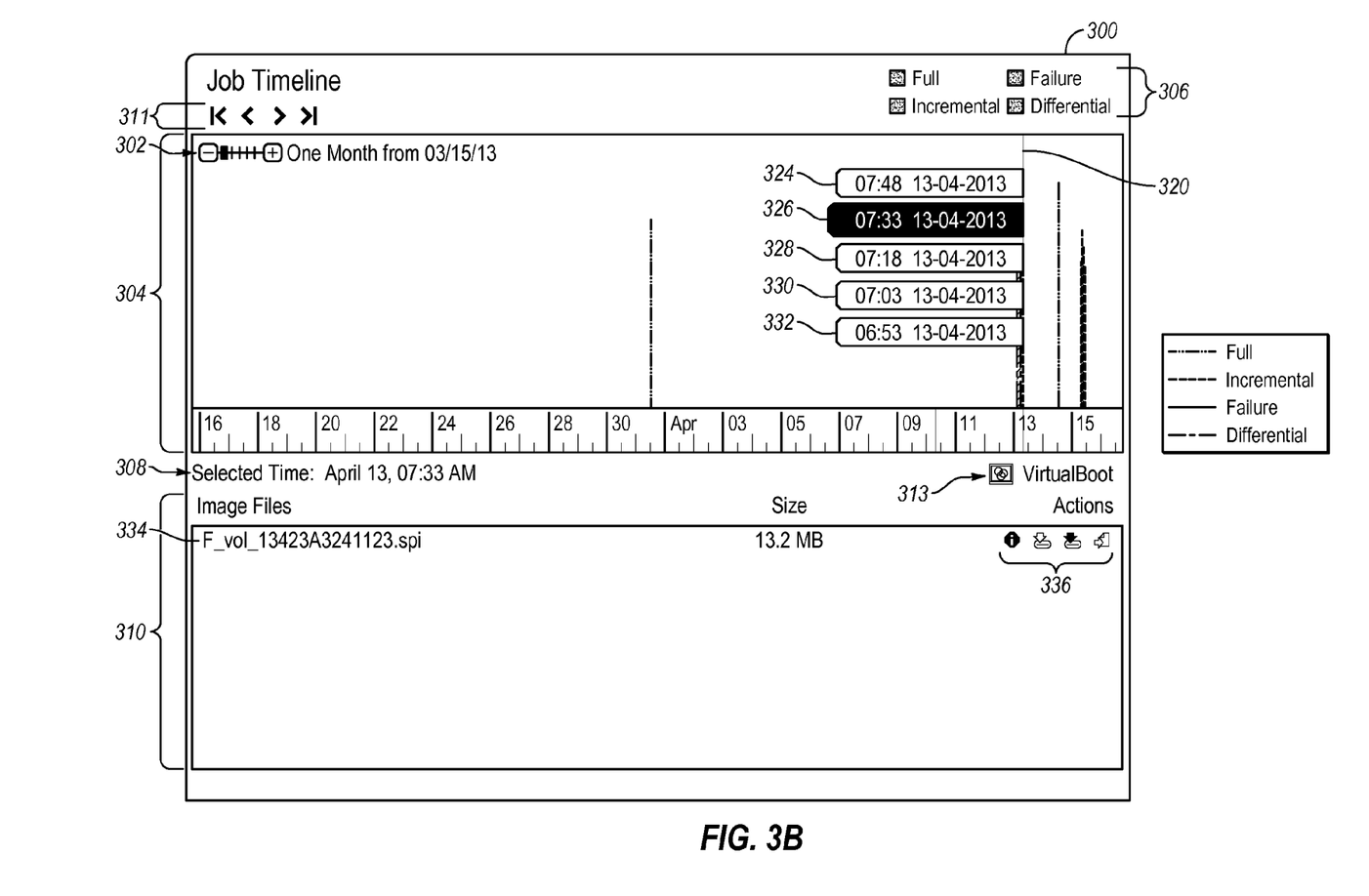
FIG. 3B illustrates the GUI timeline graph of FIG. 3A displaying various flags each corresponding to an event in the backup job.
Figure 3C:
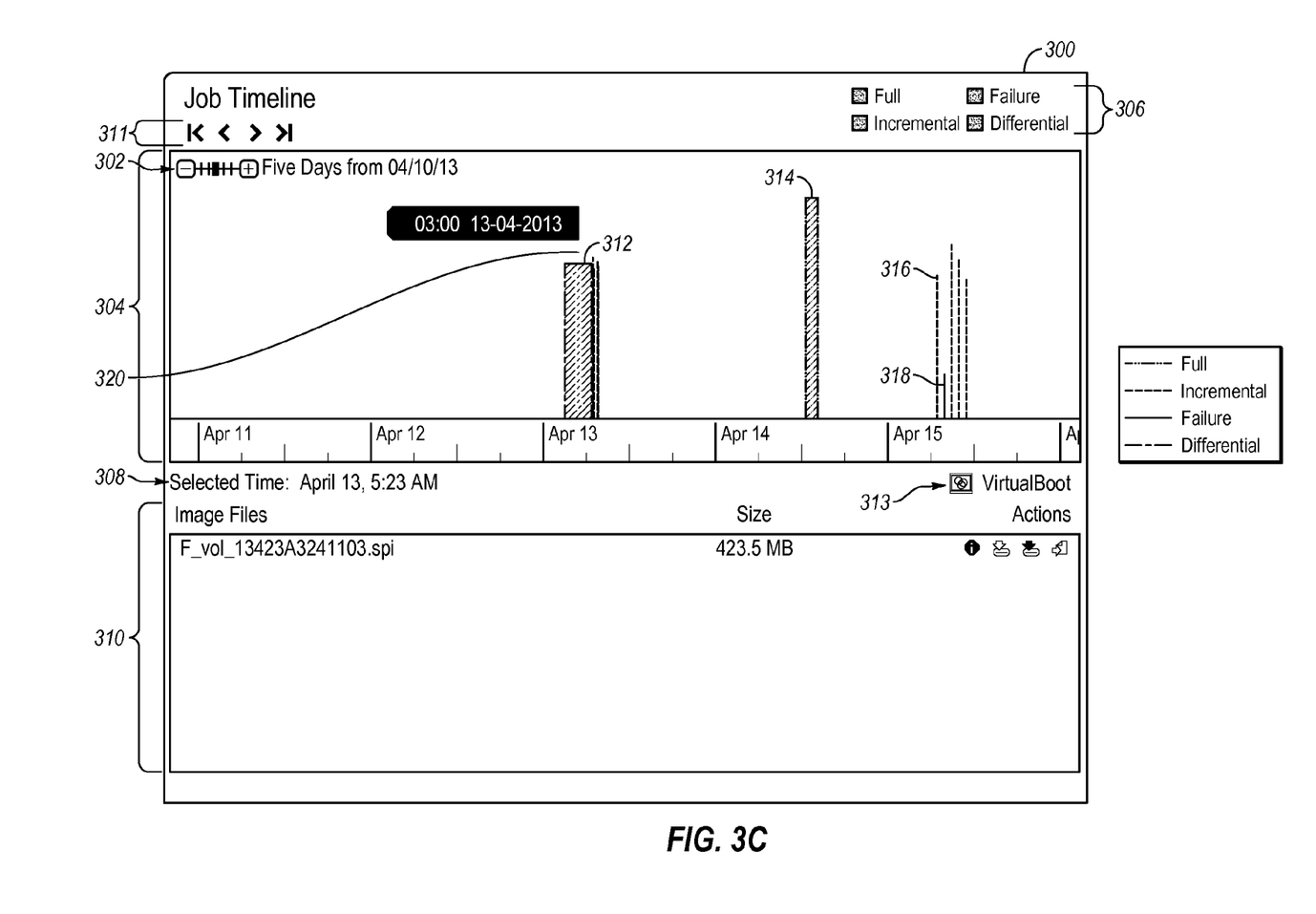
FIG. 3C illustrates the GUI timeline graph of FIG. 3A at an intermediate zoom level showing five days of events in the backup job.
Figure 3D:
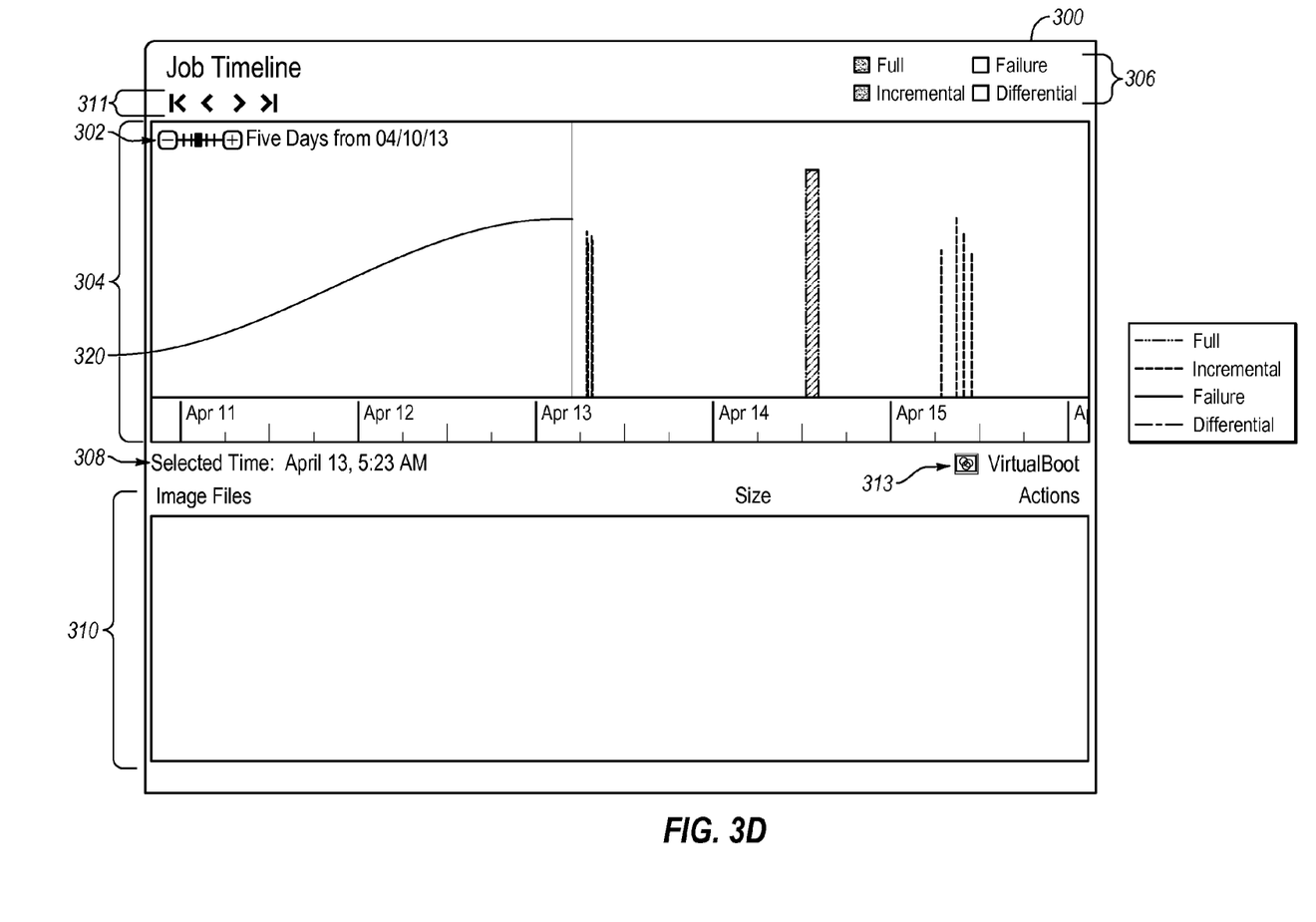
FIG. 3D illustrates the GUI timeline graph of FIG. 3C with failure and differential events hidden in the GUI timeline graph.
Figure 3E:
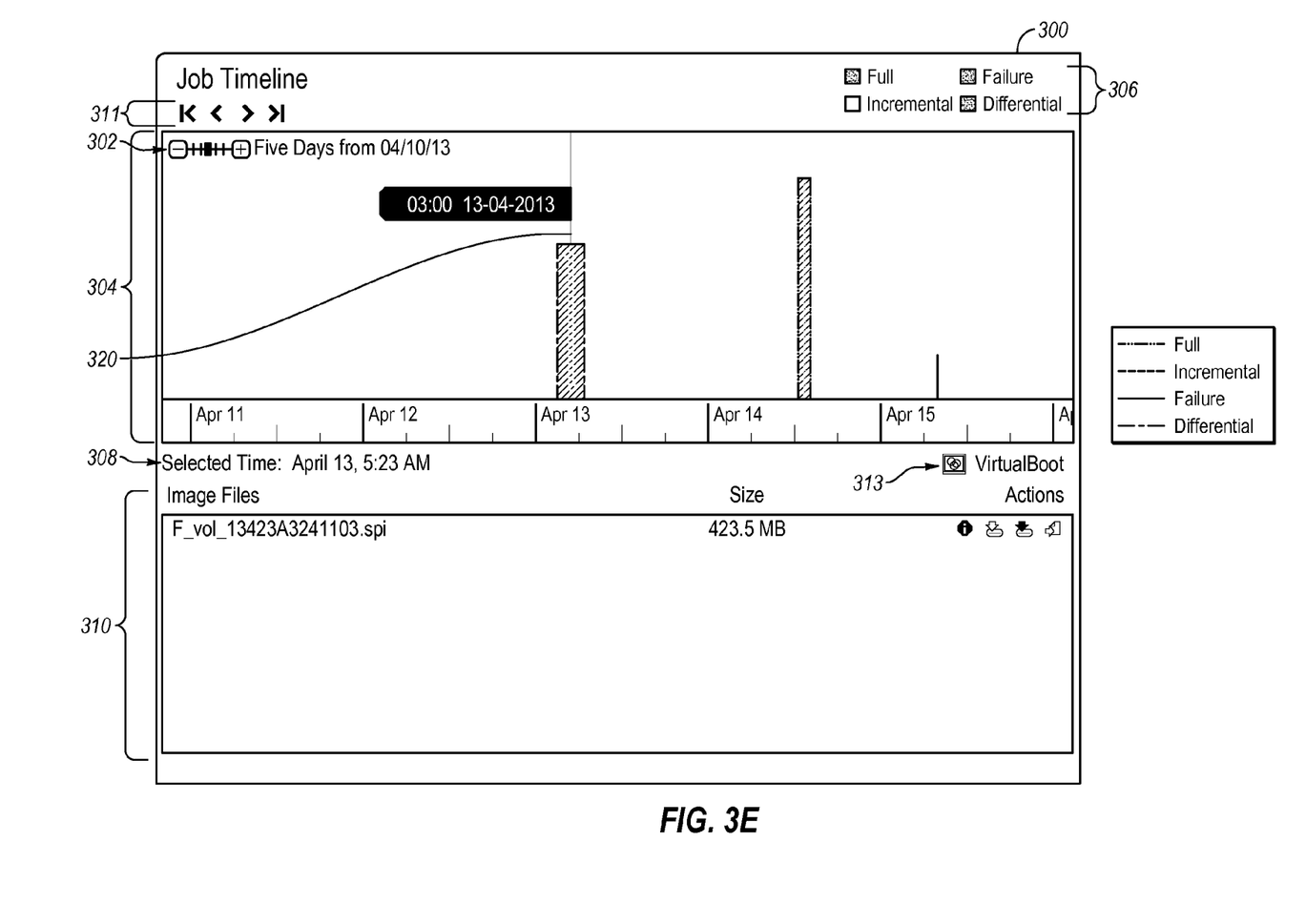
FIG. 3E illustrates the GUI timeline graph of FIG. 3C with incremental events hidden in the GUI timeline graph.
Figure 3F:
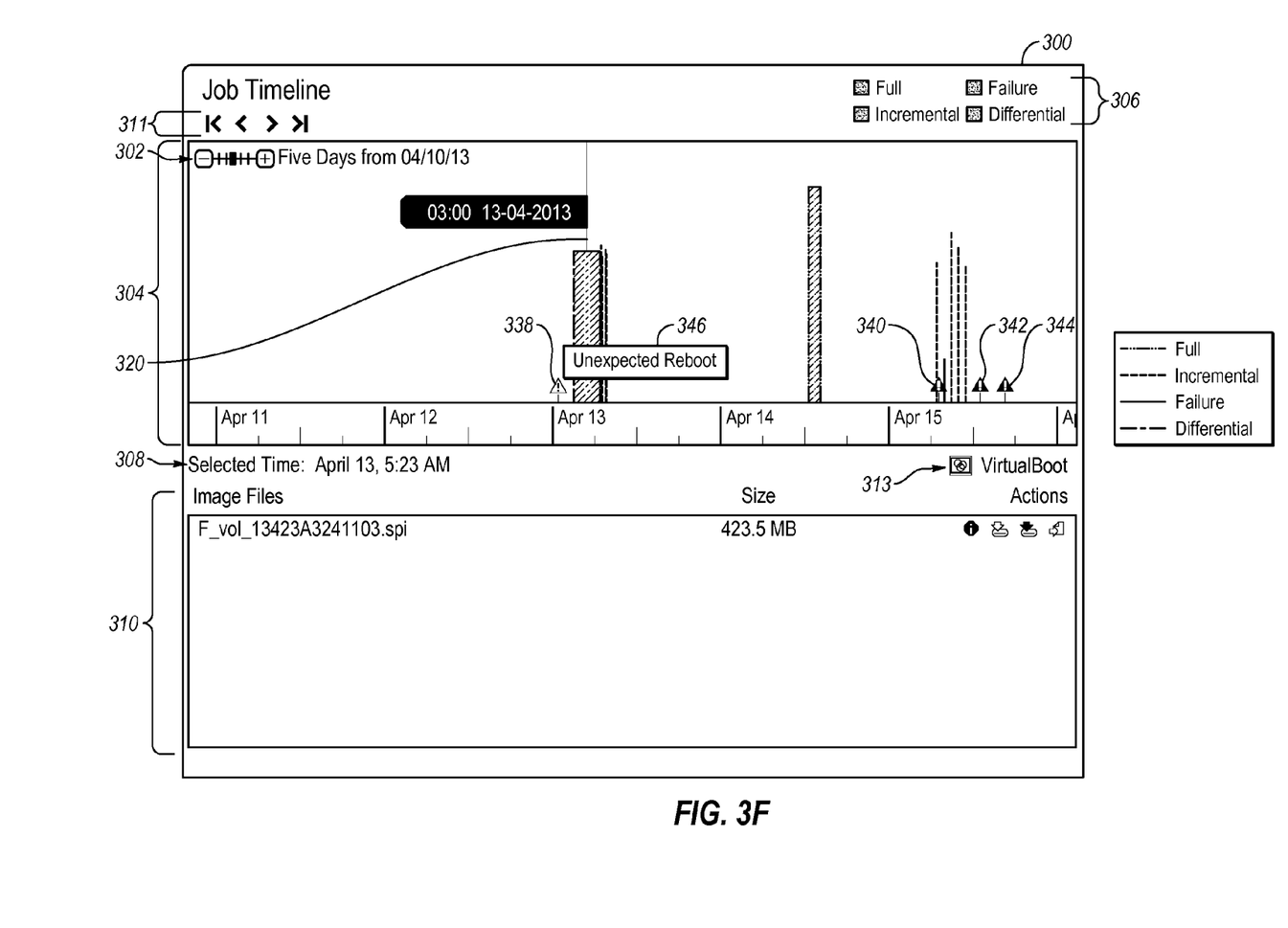
FIG. 3F illustrates the GUI timeline graph of FIG. 3C with icons indicating additional details of the backup job.
Figure 3G:
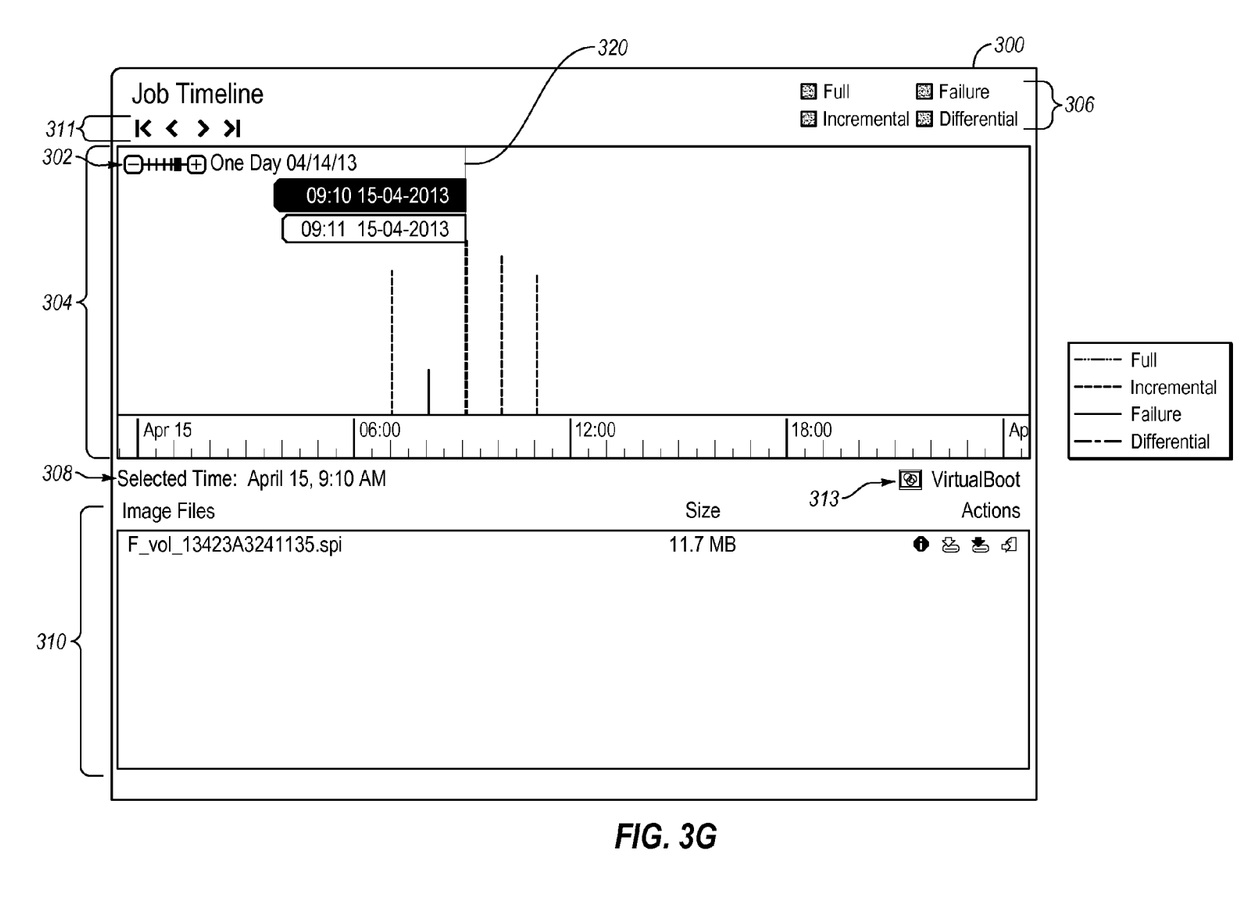
FIG. 3G illustrates the GUI timeline graph of FIG. 3A at a narrow zoom level showing one day of events in the backup job.

With reference now to FIGS. 3A-3G, additional aspects of the GUI timeline graph 300 will be disclosed. FIGS. 3A-3G illustrate the GUI timeline graph 300 at various zoom levels, with FIGS. 3A and 3B illustrating the GUI timeline graph 300 at a broad zoom level showing one month of events in the backup job, FIGS. 3C-3F illustrating the GUI timeline graph 300 at an intermediate zoom level showing five days of events in the backup job, and FIG. 3G illustrating the GUI timeline graph 300 at a narrow zoom level showing one day of events in the backup job. This zoom level can be manually adjusted by a user using the zoom level control 302. FIGS. 3A-3G also include a key for identifying the four types of events that can be included in the GUI timeline graph 300, namely, a full image backup file creation event, an incremental image backup file creation event, an image backup file failure event, and a differential image backup file creation event. It is understood that the key is to aid in the understanding of FIGS. 3A-3G, and is not actually presented to the user as part of the GUI timeline graph 300, since an event legend 306, which is presented to the user, serves a similar purpose.

As disclosed in FIG. 3A, the GUI timeline graph 300 generally includes the zoom level control 302, a timeline panel 304, the event legend 306, a selected time indicator 308, and an image files panel 310.

As noted previously, a user can manipulate the zoom level control 302 to adjust the zoom level of the horizontal axis of the timeline panel 304. In particular, a user can drag or otherwise move a selector of the zoom level control 302 to the left in order to zoom out and thereby broaden the zoom level of the horizontal axis of the timeline panel 304. Conversely, a user can drag or otherwise move a selector of the zoom level control 302 to the right in order to zoom in and thereby narrow the zoom level of the horizontal axis of the timeline panel 304. A similar zoom level control (not shown) may additionally or alternatively be included to adjust the zoom level of the vertical axis of the timeline panel 304. Alternatively, a single zoom level control may function to adjust the zoom levels of both the horizontal axis and the vertical axis simultaneously.

The timeline panel 304 includes a horizontal axis representing time periods over which events of a backup job took place, a vertical axis representing a data size associated with each of the events of the backup job, and bars positioned along the horizontal axis and the vertical axis. Each of the bars corresponds to one of the events of the backup job. A width along the horizontal axis of each of the bars represents the time period over which the corresponding event took place. Similarly, a length along the vertical axis of each of the bars represents the data size associated with the corresponding event. Various types of events may be represented by the bars in the timeline panel 304.

For example, the timeline panel 304 of FIG. 3C discloses a bar 312 corresponding to the creation of a differential image backup file, a bar 314 corresponding to the creation of a full image backup file, a bar 316 corresponding to the creation of an incremental backup file, and a bar 318 corresponding to a failure while attempting to create an image backup file. The horizontal width of each of the bars 312, 314, 316, and 318 represents the time period over which the corresponding event took place and the vertical length of each of the bars 312, 314, 316, and 318 represents the data size associated with the corresponding event. In particular, the horizontal width of the bar 312 represents the approximately four hours it took to create the corresponding differential image backup file while the horizontal width of the bar 314 represents the approximately two hours it took to create the corresponding full image backup file. At the same time, a comparison of the vertical lengths of the bars 312 and 314 indicates that the size of the differential image backup file corresponding to the bar 312 is smaller in size than the incremental image backup file corresponding to the bar 314. It is noted that the left or right side of the timeline panel 304 may include a size scale similar to the time scale along the bottom edge of the timeline panel 304.

FIGS. 3A-3C also disclose a selection indicator 320 on the timeline panel 304. The selection indicator 320 may appear, for example, upon the user selecting a point along the horizontal axis of the timeline panel 304 that corresponds to a particular point in time, via a mouse click on an electronic display or via a finger tap on a touchscreen electronic display, for example. Alternatively or additionally, the selection indicator 320 may appear as the user mouses over the timeline panel 304 with a mouse pointer or drags a finger across the timeline panel 304, for example, which causes the selection indicator 320 to correspondingly traverse across the timeline panel 304 until coming to a resting position at the position where the mouse pointer comes to a resting position or at the position where the finger is lifted.

Alternatively or additionally, the selection indicator 320 may appear as a user selects one of the First, Previous, Next, and Last buttons 311, which may cause the selection indicator 320 to jump between events. For example, when a user selects the First button, the selection indicator 320 may jump to the first event in the timeline panel 304. Conversely, when the user selects the Last button, the selection indicator 320 may jump to the last event in the timeline panel 304. In a similar manner, when the user selects the Previous button or the Next button, the selection indicator 320 may jump to the previous event or the next event, respectively, in the timeline panel 304. When the selection indicator 320 jumps to an event upon selection of one of the buttons 311, the selection indicator 320 may be positioned at the beginning, the end, or some predetermined intermediate position within the event. For example, if an event begins on a certain day at 10:00 AM and ends on the same day at 11:00 AM, when the selection indicator 320 jumps to the event upon selection of one of the buttons 311, the selection indicator 320 may be positioned at the beginning of the event at 10:00 AM, the end of the event at 11:00 AM, or at some predetermined intermediate position within the event, such as at the midpoint of the event at 10:30 AM.

The position of the selection indicator 320 may correspond to one or more bars in the timeline panel 304. As disclosed in FIGS. 3A-3G, the selection indicator 320 may correspond to a bar where the width of the selection indicator 320 at least partially overlaps at least a portion of the bar. Alternatively, the selection indicator 320 may correspond to a bar where the selection indicator 320 is within a predetermined distance along the horizontal axis from the bar.

As disclosed in FIG. 3A, where the selection indicator 320 corresponds to one of the bars, by the width of the selection indicator 320 at least partially overlapping at least a portion of the bar for example, additional details regarding the event corresponding to the bar may be displayed. As disclosed in FIG. 3A, these additional details may be displayed in a flag 322 and may include the snapshot time of the corresponding event.

As disclosed in FIG. 3B, where the selection indicator 320 corresponds to multiple bars, by the width of the selection indicator 320 at least partially overlapping at least a portion of each of the multiple bars for example, additional details regarding the events corresponding to the bars may be displayed in multiple flags 324-332. For example, although the selection indicator 320 in FIG. 3B is centered at April 13 at 7:33 AM, as indicated in the selected time indicator 308 in FIG. 3B, the width of the selection indicator 320 at least partially overlaps multiple events having snapshot times on April 13 of 7:48 AM, 7:33 AM, 7:18 AM, 7:03 AM, and 6:53 AM, as indicated in the flags 324-332.

Also disclosed in FIG. 3B, upon selection of one of the flags 324-332, the flag may be highlighted, as illustrated by the highlighted flag 326, and one or more image backup files corresponding to the event may be presented to the user, for example, in the image files panel 310. For example, upon selection of the flag 326, the image backup file 334 named "F_vol_13423A3241123.spi" may appear in the image files panel 310. The name of the image backup file 334 may be listed along with the size or other details of the image backup file 334. In addition, available actions 336 for the image backup file 334 corresponding to the event may be presented to the user. The four available actions 336 may include, for example, (1) an image details action which brings up a dialog listing additional information about the image backup file 334, (2) a mount image action which mounts the image data of the image backup file 334 as a new volume on a system, (3) a restore image action which restores the image backup file 334 to an existing volume, overwriting existing data (note—this action may only be available for backups of data volumes and not for a backup of a currently running system volume), and (4) an image conversion action which converts the image backup file 334 to a different format for use in other applications. It is understood that the available actions 336 may additionally or alternatively include other actions that may be performed on or with the image backup file 334.

Available actions for a backup job event may also be presented on the GUI timeline graph 300. For example, a virtual boot action may be presented to a user via a VirtualBoot button 313, which action creates a virtual machine for a selected image backup file, or for selected image backup files, so that the user can run a computer associated with the backup job as it existed at the point of time of the snapshot of the image backup file or files without having to restore the image backup file or files to physical hardware. The VirtualBoot button 313 may be separate from the four available actions 336 because it may depend on multiple image backup files. For example, where a backup job includes two volumes on a single computer, such as the C: and D: drives of a laptop computer, when the backup job runs it will create two separate image backup files for each specific point in time, one for the C: drive and one for the D: drive. Therefore, where the user selects an image backup file creation event in the timeline panel 304 and then selects the VirtualBoot button 313, a virtual machine will be created that uses the two image backup files that were created during the image backup file creation event, and that correspond to the C: and D: drives, so that the user can run the laptop computer as it existed at the point of time of the snapshot of the image backup files without having to restore the image backup files to physical hardware.

FIG. 3F discloses one or more icons 338-344 positioned along the horizontal axis and the vertical axis of the timeline panel 304. Each of the icons 338-344 may indicate additional details regarding an event or regarding an occurrence on the computer to which the backup job corresponds. For example, each of the icons 338-344 in FIG. 3F corresponds to a failure event. The red icons 340-344 indicate a more serious failure event than the yellow icon 338. Upon selection of one of the icons 338-344, additional details regarding the event or occurrence corresponding to the icon may be displayed. For example, upon selection of the icon 338, additional details may be displayed in a tooltip 346 and may include a description of the event or occurrence corresponding to the icon 338.

The event legend 306 may serve a dual function of both identifying event types as well as hiding or unhiding events in the timeline panel 304. For example, the box next to each event type in the event legend 306 may include a color, texture, or pattern corresponding to the event type. The event type of each corresponding bar displayed in the timeline panel 304 may then be identified by having a matching color, texture, or pattern. In this way, the color, texture, or pattern of each of the bars in the timeline panel 304 may represent the type of image backup file or files for which creation was attempted during the corresponding event, the creation status of the image backup file or files for which creation was attempted during the corresponding event, or some combination thereof.

For example, in the timeline panel 304 and the event legend 306 of FIG. 3C, the color of the bar 312 may match the color of the box next to the label "Differential," the color of the bar 314 may match the color of the box next to the label "Full," the color of the bar 316 may match the color of the box next to the label "Incremental," and the color of the bar 318 may match the color of the box next to the label "Failure." In this manner, the event type of event corresponding to each bar in the timeline panel 304 can be identified by referencing the event legend 306.

At the same time, the box next to each event type in the event legend 306 may also function as a toggle control to allow a user to alternately hide or unhide corresponding events in the timeline panel 304. For example, the event legend 306 in FIGS. 3A-3C, 3F, and 3G has all types of events unhidden in the timeline panel 304, while FIG. 3D has "Failure" and "Differential" events hidden and FIG. 3E has "Incremental" events hidden in the timeline panel 304. The hidden events in FIGS. 3D and 3E can be accomplished by selecting, and thereby toggling, the box next to each corresponding type of event in the event legend 306. In this manner, one or more of the multiple colors, textures, or patterns presented in the event legend 306 may include a control that enables any of the corresponding events to be hidden in the timeline panel 304. It is understood that the toggle control disclosed in FIGS. 3A-3G is just one example type of control, and other types of controls could alternatively or additionally be employed in the event legend 306.

The example GUI timeline graph 300 may therefore be employed to visually present a history of events of a backup job that a user can navigate. The example GUI timeline graph 300 discloses both time periods over which events of a backup job took place as well as data sizes associated with the events of the backup job, thus enabling a user to quickly grasp timing and other statistics of the image backup files of a backup job in order to ascertain the current state of the backup job.

Figure 4:
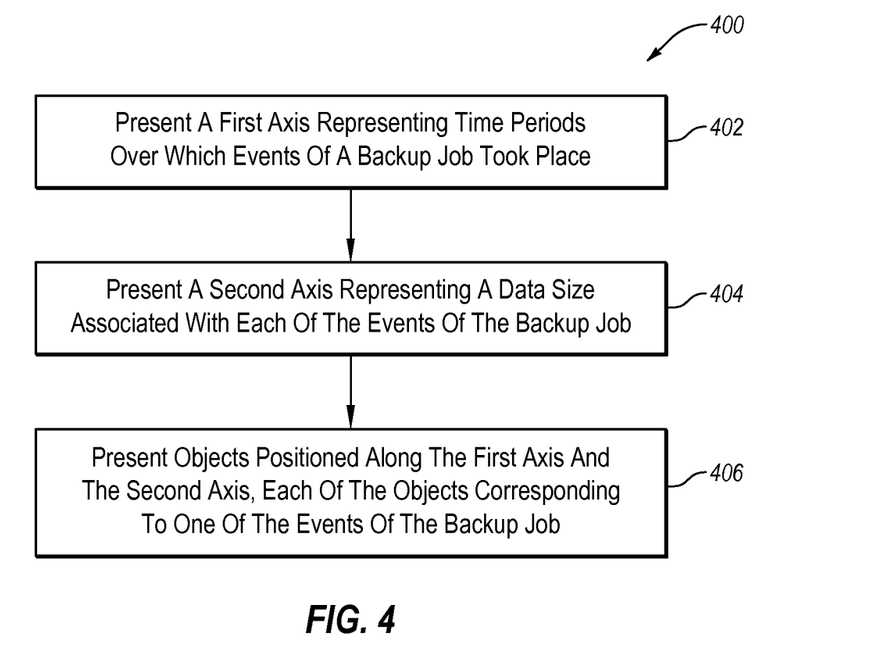
FIG. 4 is a schematic flowchart diagram of an example method for navigating events of a backup job.

FIG. 4 is a schematic flowchart illustrating an example method 400 for navigating events of a backup job. The method 400 may be implemented, in at least some embodiments, by the backup module 110 of the destination system 104 of FIG. 1. For example, the backup module 110 may be configured to execute computer instructions to perform operations of navigating events of a backup job of the source storage 106, as represented by one or more of steps 402-406 of the method 400. Prior to the method 400, various events of a backup job may have transpired, which may have resulted in the creation of one or more image backup files. Although illustrated as discrete steps, various steps may be divided into additional steps, combined into fewer steps, or eliminated, depending on the desired implementation. The method 400 will now be discussed with reference to FIGS. 1, 2, 3C, and 4.

The method 400 may begin at step 402, in which a first axis is presented representing time periods over which events of a backup job took place. At step 404, a second axis is presented representing a data size associated with each of the events of the backup job. For example, the backup module 110 of FIG. 1 may present, at steps 402 and 404, the example GUI 200 of FIG. 2 to a user on a display associated with the source system 102 or the destination system 104, such as the display device 114 for example. The GUI 200 of FIG. 2 may include the example GUI timeline graph 300 of FIG. 3C. The GUI timeline graph 300 may include the timeline panel 304, which includes a horizontal axis that represents time periods over which events of a backup job associated with the source storage 106 took place and a vertical axis that represents a data size associated with each of the events of the backup job.

Then, at step 406, objects positioned along the first axis and the second axis are presented with each of the objects corresponding to one of the events of the backup job. Continuing with the example above, the backup module 110 of FIG. 1 may present, at step 406, the example GUI 200 of FIG. 2 to a user, which may include the example GUI timeline graph 300 of FIG. 3C, which includes the horizontal axis and the vertical axis. The GUI timeline graph 300 of FIG. 3C may also include bars 312, 314, 316, and 318 positioned along the horizontal axis and the vertical axis with each of the bars 312, 314, 316, and 318 corresponding to one of the events of the backup job, such as the creation of a full image backup file (bar 314), the creation of an incremental image backup file (bar 316), the creation of a differential image backup file (bar 312), or a failure while attempting to create an image backup file (318). The width along the horizontal axis of each of the presented bars 312, 314, 316, and 318 may represent the time period over which the corresponding event took place, and a length along the vertical axis of each of the presented bars 312, 314, 316, and 318 may represent the data size associated with the corresponding event.

It is understood that the example method 400 may further include other steps associated with any of the other functionality of the GUI timeline graph 300.

As illustrated in the example method 400, a user may be presented with a history of events of a backup job that a user can navigate. This presentation may include both time periods over which events of a backup job took place as well as data sizes associated with the events of the backup job, thus enabling a user to quickly grasp timing and other statistics of the image backup files of a backup job in order to ascertain the current state of the backup job.

It is understood that in the foregoing discussion the horizontal and vertical axes could be reversed and/or be replaced axes that are not perfectly horizontal or vertical such as diagonal axes. It is also understood that the length of each bar may be logarithmically-based to, for example, exaggerate small values and diminish large values in the size associated with each corresponding event. It is further understood that each rectangular bar could be replaced with any other visual object positioned along a first and second axis.

The embodiments described herein may include the use of a special purpose or general purpose computer, including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose computer, special purpose computer, or virtual computer such as a virtual machine. Combinations of the above may also be included within the scope of computer-readable media.

Computer-executable instructions comprise, for example, instructions and data which cause a general purpose computer, special purpose computer, or virtual computer such as a virtual machine to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. One or more non-transitory computer-readable media storing a program that causes a processor to generate and visually present, on an electronic display device associated with the processor, a graphical user interface (GUI) timeline graph for navigating events of a backup job, the GUI timeline graph comprising:
    a first axis representing time periods over which events of a backup job took place;
    a second axis representing a data size associated with each of the events of the backup job; and
    objects positioned along the first axis and the second axis, each of the objects corresponding to one of the events of the backup job, a width along the first axis of each of the objects representing the time period over which the corresponding event took place, and a length along the second axis of each of the objects representing the data size associated with the corresponding event.

2. The one or more non-transitory computer-readable media as recited in claim 1, wherein the first axis is a horizontal axis.

3. The one or more non-transitory computer-readable media as recited in claim 2, wherein the second axis is a vertical axis.

4. The one or more non-transitory computer-readable media as recited in claim 3, wherein the length of each object along the vertical axis is logarithmically-based.

5. The one or more non-transitory computer-readable media as recited in claim 1, wherein each of the objects is a bar.

6. The one or more non-transitory computer-readable media as recited in claim 5, wherein:
    the backup job includes repeated attempts to create an image backup file for each of one or more volumes of a computer; and
    each of the events includes an attempt to create a full image backup file or an incremental image backup file for each of the one or more volumes.

7. The one or more non-transitory computer-readable media as recited in claim 6, wherein a color, texture, or pattern of each of the bars represents the type of image backup file or files for which creation was attempted during the corresponding event, a creation status of the image backup file or files for which creation was attempted during the corresponding event, or some combination thereof.

8. The one or more non-transitory computer-readable media as recited in claim 7, wherein the GUI timeline graph further comprises a legend which presents a meaning for the color, texture, or pattern of each of the bars.

9. One or more non-transitory computer-readable media storing a program that causes a processor to generate and visually present, on an electronic display device associated with the processor, a graphical user interface (GUI) timeline graph for navigating events of a backup job, the GUI timeline graph comprising:
    a first axis representing time periods over which events of a backup job took place, each of the events of the backup job including an attempt to create an image backup file for each of one or more volumes of a computer;
    a second axis representing a data size of the image backup file or files associated with each of the events of the backup job; and
    objects positioned along the first axis and the second axis, each of the objects corresponding to one of the events of the backup job, a width along the first axis of each of the objects representing the time period over which the corresponding event took place, and a length along the second axis of each of the objects representing the data size associated with the corresponding event.

10. The one or more non-transitory computer-readable media as recited in claim 9, wherein the GUI timeline graph further comprises one or more icons positioned along the first axis and the second axis, each of the one or more icons indicating additional details regarding an event corresponding to one of the objects or regarding an occurrence on the computer.

11. The one or more non-transitory computer-readable media as recited in claim 9, wherein:
    the first axis is a horizontal axis;
    the second axis is a vertical axis;
    each of the objects is a bar; and each of the bars includes one of multiple colors, textures, or patterns representing the type of image backup file or files for which creation was attempted during the corresponding event, a creation status of the image backup file or files for which creation was attempted during the corresponding event, or some combination thereof.

12. The one or more non-transitory computer-readable media as recited in claim 11, wherein the GUI timeline graph further comprises a legend which presents a meaning for each of the multiple colors, textures, or patterns.

13. The one or more non-transitory computer-readable media as recited in claim 12, wherein one or more of the multiple colors, textures, or patterns presented in the legend includes a control that enables any of the corresponding bars to be hidden in the GUI timeline graph.

14. The one or more non-transitory computer-readable media as recited in claim 11, wherein, upon selection of a point along the first axis that corresponds to one of the bars, the GUI timeline graph is configured to:
visually present additional details regarding the event corresponding to the bar; and
visually present one or more available actions for the image backup file or files corresponding to the event.

15. The one or more non-transitory computer-readable media as recited in claim 9, wherein the electronic display device is a touchscreen electronic display device.

16. A method for navigating events of a backup job, the method comprising:
visually presenting, on an electronic display device, a first axis representing time periods over which events of a backup job took place;
visually presenting, on the electronic display device, a second axis representing a data size associated with each of the events of the backup job; and
visually presenting, on the electronic display device, objects positioned along the first axis and the second axis, each of the objects corresponding to one of the events of the backup job, a width along the first axis of each of the objects representing the time period over which the corresponding event took place, and a length along the second axis of each of the objects representing the data size associated with the corresponding event.

17. The method as recited in claim 16, further comprising:
upon selection of a point along the first axis that corresponds to one of the bars, visually presenting, on the electronic display device, a flag corresponding to the event corresponding to the bar; and
upon selection of the flag, visually presenting, on the electronic display device, one or more available actions for the image backup file or files corresponding to the event.

18. The method as recited in claim 16, wherein the flag visually presents the snapshot time of the corresponding event.

19. The method as recited in claim 16, further comprising:
upon reception of an indication that a visual presentation scale of the first axis should change, changing the visual presentation scale of the first axis; and
upon reception of an indication that a visual presentation time period of the first axis should change, changing the visual presentation time period of the first axis.

20. One or more non-transitory computer-readable media storing a program that causes a processor to execute the method as recited in claim 16.

* * * * *